Patented July 22, 1952

2,604,439

UNITED STATES PATENT OFFICE 2,604,439

AZEOTROPIC DISTILLATION OF HALO-OLEFINS

Alan C. Nixon, Berkeley, Calif., assignor to Shell Development Company, San Francisco, Calif., a corporation of Delaware No Drawing. Application November 26, 1949, Serial No. 129,700

5 Claims. (Cl. 202—42)

This invention relates to the separation of 2-alkenyl halides from halo-olefin mixtures containing the 2-alkenyl halides in admixture with 1-alkenyl halides which are separable from said 2-alkenyl halides only with difficulty by practical scale fractionating means. The invention relates more particularly to the separation of halo-olefin mixtures containing 2-alkenyl halides and 1-alkenyl halides having closely approximating boiling temperatures and wherein the unsaturated carbon atom in the position adjacent to the halogenated carbon atom in said alkenyl halides is a tertiary carbon atom. A particular aspect of the invention relates to the separation of methallyl chloride from isocrotyl chloride.

In the production of 2-alkenyl halides on a practical scale, for example, by halogenation of an olefin or dehydrohalogenation of a dihalo aliphatic hydrocarbon, the resulting product is often unavoidably contaminated with other halo-olefins generally comprising 1-alkenyl halides. In the practical scale production of methallyl chloride this compound is generally obtained in admixture with varying amounts of isocrotyl chloride. The ability to utilize a 2-alkenyl halide as starting or intermediate material in the production of derivative products therefrom, is often dependent upon the absence therein of any substantial amount of other halo-olefins. The presence of such contaminant halo-olefins often renders exceedingly difficult the production of satisfactory yields of derivative products amenable to further purification without additional relatively costly steps of purification. Further, disadvantages occasioned by the presence of the contaminant halo-olefin in the 2-alkenyl halide include operational difficulties attributable to side reactions and increased corrosiveness. Often these undesirable effects of the contaminant are increased in the presence of other materials employed in subsequent use or treatment of the 2-alkenyl halide. Such difficulties often necessitate the use of special equipment, such as, for example, apparatus constructed of material particularly resistant to corrosion thereby materially increasing the initial installation cost of the unit wherein such halo-olefin contaminated 2-alkenyl halide is to be processed.

The obtaining of a 2-alkenyl halide which is free of any substantial amount of contaminant halo-olefins is generally made particularly difficult because of the presence in the crude product of the 1-alkenyl halide, the boiling temperature of which closely approximates that of the 2-alkenyl halide, thereby rendering separation by such methods as practical scale fractionating means difficult if not impossible.

It is an object of the present invention to provide an improved process enabling the more efficient separation of 2-alkenyl halides from the corresponding 1-alkenyl halides having closely approximating boiling temperatures.

Another object of the invention is the provision of an improved process enabling the more efficient separation of halo-olefin mixtures consisting essentially of 2-alkenyl halides in admixture with 1-alkenyl halides which have closely approximating boiling temperatures and in which halides the unsaturated carbon atom in the position adjacent to the halogenated carbon atom is a tertiary carbon atom.

A more particular object of the invention is the provision of an improved process enabling the more efficient separation of a 2-alkenyl halide from a mixture consisting essentially of 2-alkenyl halides and 1-alkenyl halides having four carbon atoms to the molecule and wherein the unsaturated carbon atom in the position adjacent to the halogenated carbon atom is a tertiary carbon atom.

A still more particular object of the invention is the provision of an improved process enabling the more efficient separation of methallyl chloride from a mixture of halo-olefins containing said methallyl chloride in admixture with isocrotyl chloride. Other objects and advantages of the invention will become apparent from the following detailed description thereof.

In accordance with the invention a 2-alkenyl halide is separated from a halo-olefin mixture consisting essentially of said 2-alkenyl halide in admixture with a 1-alkenyl halide the boiling temperature of which closely approximates that of the 2-alkenyl halide, by distilling the mixture in the presence of an added aliphatic ketone. Thus, in a more particular application of the invention a 2-alkenyl halide having four carbon atoms to the molecule such as, for example, methallyl chloride, is separated from the corresponding 1-alkenyl halide having four carbon atoms to the molecule such as, for example, isocrotyl chloride, by subjecting the mixture to distillation in the presence of acetone. The ketone, it is found, forms an azeotrope with the 1-alkenyl halide and passes overhead from the column thereby enabling the substantially complete separation of 1-alkenyl halide as an azeotropic composition with said ketone from the residual 2-alkenyl halide.

The invention is applied to the separation of 2-alkenyl halides having from three to nine carbon atoms to the molecule from 1-alkenyl halides having from three to nine carbon atoms to the molecule and which have boiling temperatures closely approximating that of the 2-alkenyl halide. The class of 2-alkenyl halides, also referred to as allyl-type halides, to the separation of which the present invention, is directed, comprises the grouping

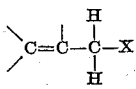

wherein X represents a halogen. Representative examples of such 2-alkenyl halides comprise:

$$CH_2=CH-CH_2Cl$$
$$CH_2=CH-CH_2Br$$
$$CH_2=CH-CH_2I$$
$$CH_3-CH=CH-CH_2Cl$$
$$CH_3-CH=CH-CH_2Br$$
$$CH_2=C(CH_3)CH_2Cl$$
$$CH_2=C(CH_3)CH_2Br$$

The 1-alkenyl halides, also referred to as vinyl-type halides having from three to nine carbon atoms to the molecule which are separated from the above-defined 2-alkenyl halides in the process of the invention comprise the grouping

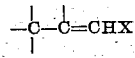

wherein X represents a halogen. Examples of this class of 1-alkenyl halides include:

$$CH_3-CH=CHCl$$
$$CH_3-C(CH_3)=CHCl$$
$$CH_3-CH=CHBr$$
$$CH_3-C(CH_3)=CHBr$$
$$CH_3-CH=CHI$$
$$C(CH_3)_3-CH_2-CH=CHCl$$

The process of the invention is applied with particular advantage to the separation of the 2-alkenyl halides wherein the unsaturated carbon atom adjacent to the halogenated carbon atom is a tertiary carbon atom, that is, those comprising the grouping

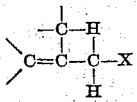

from the corresponding 1-alkenyl halides having closely approximating boiling temperature and containing the grouping

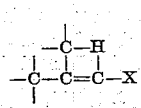

Examples of the members of this sub-class of 2-alkenyl halides comprise $CH_2=C(CH_3)CH_2Cl$, $CH_2=C(CH_3)CH_2Br$, $CH_2=C(CH_3)CH_2I$ $$CH(CH_3)=C(CH_3)CH_2Cl$$
$$CH(CH_3)=C(CH_3)CH_2Br$$

$C(CH_3)_2=C(CH_3)CH_2Cl$, etc. Examples of the members of the corresponding sub-class of 1-alkenyl halides comprise: $CH_3C(CH_3)=CHCl$ $$CH_3C(CH_3)=CHBr$$
$$CH_3C(CH_3)=CHI$$
$$CH_2(CH_3)C(CH_3)=CH_2Cl$$
$$CH(CH_3)_2C(CH_3)=CH_2Cl$$

$C(CH_3)_3C(CH_3)=CH_2Cl$, etc.

The process of the invention is particularly effective in serving as a means for the separation of the 2-alkenyl halides having four carbon atoms to the molecule from the corresponding 1-alkenyl halides having boiling temperatures closely approximating those of the corresponding 2-alkenyl halides. Mixtures of such four carbon atom alkenyl halides separated in accordance with the invention comprise, for example, mixtures of methallyl chloride with isocrotyl chloride, methallyl bromide with isocrotyl bromide, etc.

In the alkenyl halides described hereinabove, to the separation of which the present invention is directed, the halogen atom can be, for example, chlorine, bromine or iodine. The invention is, however, applied with particular advantage to the separation of the above defined alkenyl halides wherein the halogen atom is a halogen having an atomic number of from 17 to 35, inclusive.

By the phrase "consisting essentially of" as used throughout the specification and attached claims it is intended to mean that the compositions to which it is applied are made up almost entirely of the components recited and that these components are the main and characterizing ones; but this expression does not exclude the presence of minor amounts of other constituents which are ordinarily found to be present in such compositions.

The ketones, in the presence of which the alkenyl halides are distilled in accordance with the process of the invention, consist of the aliphatic saturated ketones the boiling temperatures of which are lower than, or do not substantially exceed those of, the alkenyl halides being separated. The particular ketone chosen for a particular separation will depend upon the specific mixture being separated. In a preferred method of carrying out the invention the alkenyl halide mixture to be separated is distilled in the presence of an aliphatic saturated ketone the boiling temperature of which lies between that of the 2-alkenyl halide component of the mixture and a temperature about 20° below this temperature. Examples of aliphatic ketones which may be employed in the process of the invention comprise, for example, acetone.

In the distillation of the alkenyl halide mixtures in accordance with the process of the invention the alkenyl halide mixture to be separated and the aliphatic ketone are introduced into a suitable distillation zone and therein subjected to distillation. The aliphatic ketone may be added to the alkenyl halide mixture prior to its introduction into the distillation zone or a part or all of the ketone may be introduced as a separate stream into the distillation zone. Any conventional type of distillation apparatus may be employed, the distillation may be executed in batch, semi-continuous or continuous operation. The distillation may be carried out at subatmospheric, atmospheric or superatmospheric pressure.

The distillation will proceed with the formation of a minimum boiling azeotrope containing 1-alkenyl halide component of the alkenyl halide mixture and the added ketone. The 1-alkenyl halide will thus be taken overhead in the distillation leaving the 2-alkenyl halide as residual or bottoms product. The amount of aliphatic ketone added to the alkenyl halide charge may vary within the scope of the invention depending upon the composition of the specific halide mixture charged, the distillation conditions employed, and residual alkenyl halide product desired. In general, it has been found advantageous to add the ketone in an amount in excess of the minimum necessary to form a minimum boiling azeotrope with the 1-alkenyl halide component, although greater or lesser amounts of the ketone may be employed within the scope of the invention. Thus, in the separation of 2-alkenyl from 1-alkenyl halides having four carbon atoms to the molecule, such as the separation of isocrotyl chloride from methallyl chloride, with the aid of acetone at atmospheric pressure, it has been found that the azeotrope formed contains 19% by weight of isocrotyl chloride. The isocrotyl chloride-acetone azeotrope thus obtained has a boiling temperature of 55.6° C. at atmospheric pressure. By continuous distillation in a fifty-plate column at a reflux to feed ratio of 3, with a 2:3 acetone to total chlorides ratio, reduction of the isocrotyl chloride content in a methallyl chloride-isocrotyl chloride mixture from 13% to 2% by weight has been obtained with a 99% recovery of methallyl chloride. When complete removal of the isocrotyl chloride from the methallyl chloride is desired, the acetone is added in an amount at least equal to four times the weight of isocrotyl chloride in the mixture being distilled. In a preferred method of purifying the methallyl chloride contaminated with isocrotyl chloride, however, the mixture is distilled in the presence of an amount of acetone at least equal to ten times the weight of the isocrotyl chloride content of the methallyl chloride-isocrotyl chloride charge. The invention is of coure not limited with respect to the amount of acetone added in excess of the minimum required amount. Thus the use of amounts ranging from four to 50, and preferably from four to 25 times the weight of isocrotyl chloride content of the mixture is employed. Greater amounts of the aliphatic ketone may, however, be employed within the scope of the invention.

Separation of the aliphatic ketone from admixture with the 1-alkenyl halide as obtained overhead from the distillation may be accomplished by conventional means comprising such steps as, for example, solvent extraction, extractive distillation, selective adsorption, etc. Thus, acetone may be recovered from the mixtures of acetone-isocrotyl chloride obtained overhead in the distillation of methallyl chloride-isocrotyl chloride mixtures in the presence of acetone by subjecting the mixture to one or more such steps as scrubbing with water, extractive distillation in the presence of water, etc. In the continuous operation of the process of the invention, aliphatic ketone recovered from the distillation products may be recycled to the distillation zone wherein the mixture of 2-alkenyl halides and 1-alkenyl halides are being distilled in accordance with the invention.

The efficiency with which 2-alkenyl halides are separated from mixtures comprising them in admixture with 1-alkenyl halides in accordance with the method of the invention is illustrated by the following examples:

EXAMPLE I

Methallyl chloride contaminated by the presence therein of isocrotyl chloride in an amount of 13% by weight was subjected to batch distillation in the presence of added acetone. Addition of the acetone to the methallyl chloride-isocrotyl chloride mixture resulted in a composite charge having the following composition in weight per cent:

|  | Per cent |
|---|---|
| Methallyl chloride | 23.4 |
| Isocrotyl chloride | 3.7 |
| Acetone | 72.9 |

The mixture was subjected to distillation at atmospheric pressure in a still provided with a bubble plate column containing the equivalent of 30 theoretical plates, at a reflux ratio of 40. When 32.8% of the total charge had been distilled off, about 80% of the original isocrotyl chloride content of the charge was contained in the overhead while only about 0.2% of the methallyl chloride in the charge was in the distillate.

EXAMPLE II

A mixture consisting of 52.7% methallyl chloride, 8.7% isocrotyl chloride and 38.6% acetone (per cent by weight) was subjected to batch distillation under conditions substantially identical to those employed in the operation of Example I with the exception that the distillation was conducted at a pressure of 400 mm. After distilling off 41.3% of the charge it was found that approximately 89% of the isocrotyl chloride content of the original charge had been taken overhead and that the distillate contained less than 2.2% methallyl chloride.

EXAMPLE III

Isocrotyl chloride was removed from admixture with methallyl chloride by continuous azeotropic distillation in a fractionating column in the presence of acetone. The acetone was added to the methallyl chloride-isocrotyl chloride mixture before introduction into the distillation column. Conditions employed and results obtained in each of three operations are indicated in the following table:

*Table*

| Run | A42, 1 | B11, 2 | B12, 3 |
|---|---|---|---|
| Plates in column | 40 | 40 | 40 |
| Feed plate | 20 | 20 | 20 |
| Reflux to feed ratio | 3.3 | 6.8 | 6.4 |
| Feed, weight per cent: |  |  |  |
| acetone | 33.2 | 40.0 | 40.0 |
| methallyl chloride | 60.0 | 53.0 | 53.0 |
| isocrotyl chloride | 6.7 | 7.0 | 7.0 |
| Overhead product, weight per cent | 37 | 49 | 46 |
| acetone | 86.2 | 81.0 | 86.8 |
| methallyl chloride | 3.0 | 5.9 | 2.4 |
| isocrotyl chloride | 10.8 | 13.1 | 10.8 |
| Bottom product, weight per cent | 63 | 51 | 54 |
| acetone | 2.1 | 0.2 | 0.3 |
| methallyl chloride | 96.7 | 98.3 | 98.1 |
| isocrotyl chloride | 1.1 | 1.5 | 1.6 |

The invention claimed is:

1. The process for separating methallyl chloride from a mixture of alkenyl chlorides consisting essentially of methallyl chloride and isocrotyl chloride, which comprises the step of distilling said mixture in the presence of an amount of acetone at least equal to four times the weight of the isocrotyl chloride content of said mixture.

2. The process for separating methallyl chloride from a mixture of alkenyl chlorides consisting essentially of methallyl chloride and isocrotyl chloride, which comprises the step of distilling said mixture in the presence of an amount of acetone in the range of from about 4 to about 25 times the weight of the isocrotyl chloride content of said mixture.

3. The process for purifying methallyl chloride contaminated by the presence therein of impurities consisting essentially of isocrotyl chloride, which comprises the step of distilling said contaminated methallyl chloride in the presence of an amount of acetone substantially exceeding the weight of the isocrotyl chloride content of said contaminated methallyl chloride.

4. The process for purifying a 2-alkenyl chloride having four carbon atoms to the molecule contaminated by the presence therein of a 1-alkenyl chloride the boiling temperature of which closely approximates that of said 2-alkenyl chloride which comprises the step of distilling said contaminated 2-alkenyl chloride in the presence of an amount of acetone substantially exceeding the weight of 1-alkenyl chloride in said contaminated 2-alkenyl chloride.

5. The process for purifying a 2-alkenyl chloride having four carbon atoms to the molecule contaminated by the presence therein of a 1-alkenyl chloride the boiling temperature of which closely approximates that of said 2-alkenyl chloride which comprises the step of distilling said contaminated 2-alkenyl chloride in the presence of an amount of acetone in the range of from about four to about twenty-five times the weight of 1-alkenyl chloride in said contaminated 2-alkenyl chloride.

ALAN C. NIXON.

REFERENCES CITED

The following references are of record in the file of this patent:

UNITED STATES PATENTS

| Number | Name | Date |
|---|---|---|
| 2,042,223 | Groll et al. | May 26, 1936 |
| 2,212,810 | Field | Aug. 27, 1940 |
| 2,293,317 | Taylor et al. | Aug. 18, 1942 |
| 2,372,941 | Evans et al. | Apr. 3, 1945 |
| 2,445,738 | Willert | July 20, 1948 |
| 2,452,797 | Smith | Nov. 2, 1948 |

OTHER REFERENCES

Industrial and Engineering Chemistry, vol. 31, No. 11, November 1939, pages 1413–1419, "Halogenation of Hydrocarbons," by Burgin et al.